United States Patent [19]

Keyser et al.

[11] 3,749,177

[45] July 31, 1973

[54] AGRICULTURAL IMPLEMENT

[75] Inventors: Merle D. Keyser; Howard R. Jones, Jr., both of Bartlesville, Okla.

[73] Assignee: Five Star Engineering, Inc., Dewey, Okla.

[22] Filed: July 23, 1970

[21] Appl. No.: 57,716

[52] U.S. Cl. .................................. 172/44, 172/720
[51] Int. Cl. ............................................ A01b 39/19
[58] Field of Search .............................. 172/44, 720

[56] References Cited
UNITED STATES PATENTS

| 447,521 | 3/1891 | Ball .................................. 172/706 |
| 3,153,457 | 10/1964 | Van Der Lely ..................... 172/705 |
| 3,633,678 | 1/1972 | Leduc ................................ 172/44 |
| 3,186,494 | 6/1965 | Jackson ............................. 172/44 |
| 3,360,053 | 12/1967 | Doepker ............................ 172/44 |
| 1,614,808 | 1/1927 | Suek et al. ......................... 172/720 |
| 3,033,294 | 5/1962 | Edwards ............................ 172/44 |
| 3,246,703 | 4/1966 | Erdman ............................. 172/44 |
| 3,542,134 | 11/1970 | Wigness ............................ 172/44 |
| 2,699,714 | 1/1955 | Fundingsland .................... 172/44 |

Primary Examiner—Robert E. Pulfrey
Assistant Examiner—Eugene H. Eickholt
Attorney—Shanley and O'Neil

[57] ABSTRACT

Agricultural implement comprises a rod weeder including an inarticulate, resiliently flexible weeder rod which is drawn through the soil. The resilient flexibility of the weeder rod is of a magnitude to maintain the rod substantially free of soil accumulation. The structure is marked by absence of means for driving the weeder rod in rotation about its longitudinal axis. The weeder rod is mounted on rod holders, each of which includes a bracket and a rod bearing. The rod bearing moves along an upright track on the bracket, and can be selectively locked at various heights so that the working depth of associated earthworking equipment can be adjusted while the weeder rod working depth is maintained at a constant value.

21 Claims, 4 Drawing Figures

Patented July 31, 1973 3,749,177

INVENTORS
MERLE D. KEYSER
HOWARD R. JONES, JR.

BY Shanley + Neil

ATTORNEYS

Patented July 31, 1973

INVENTORS
MERLE D. KEYSER
HOWARD R. JONES, JR.

BY Shanley & Neil

ATTORNEYS

AGRICULTURAL IMPLEMENT

BACKGROUND OF THE INVENTION

Rod weeders conventionally include a steel weeder rod which is drawn through the soil at a location just below the surface of the soil. As is well known, the weeder rod performs a number of beneficial functions, including upturning weeds for withering and dying, breaking up large clods of earth, and compacting the soil, among others.

However, prior art rod weeders suffered from a number of disadvantages or deficiencies which prevented their being entirely satisfactory. For one thing, the steel weeder rods tended to accumulate soil as they were drawn through the earth. The accumulated soil, including small roots, pebbles, grass, weeds and the like, reduced the effectiveness of the rod in performing its functions, and created a drag on the prime mover. The extent of interference with the earthworking operation progressively increased as the soil accumulation increased. The soil accumulation progressively slowed down the operation, and eventually stopped it when so much soil accumulated on the rod that the equipment could no longer effectively operate. The operator then had to stop the operation to clean the accumulated soil from the weeder rod.

To overcome this problem, it was proposed to provide power means for driving the weeder rod in rotation about its longitudinal axis, and this was to a large extent successful in preventing soil accumulation on the weeder rod. However, the provision of power-driven rod systems created further problems. For one thing, the cost of the equipment was increased considerably; the motor, power transmission and bearings for the rod were expensive and the transmission and the rod bearings were necessarily fairly complex structures. Also, the powered rod systems required periodic lubrication and other service, and tended to break down too frequently. Worn moving parts often had to be replaced; particularly the bearings in which the rod rotated. The bearings tended to wear out rapidly, in part because of the abrasive dust conditions under which the equipment had to perform. In sum, maintenance of the powered rod systems was excessive. Also, because of the bulk of the equipment, shipping and handling of the powered rod weeders was expensive and difficult.

Another problem with powered rod weeders related to the excessive time requirements and difficulty involved in mounting the rod weeder, including the drive system, on various types of farm equipment. This was a significant drawback, because many rod weeders are made as attachments for other agricultural equipment, e.g., chisel plows. Still a further problem associated with power-driven rods was the fact that the mechanical connection at which power was transmitted to the rod was often large and tended to make a wide furrow and accumulate soil.

Notwithstanding all the disadvantages of power-driven weeder rods, the powered systems were accepted as presenting lesser evils than those presented by all known non-driven rods.

Another problem associated with weeder rods of the prior art was their impracticality of use in working soil having many rocks or other subsurface obstructions. For example, such an obstruction, when encountered by one of the points of a chisel plow, would throw the associated plow shank upwardly out of lateral alignment with the other shanks. Since the weeder rod is attached to the plow shanks, such misalignment of a shank would bend the steel weeder rod. Or, contact of the weeder rod itself with such an obstruction could result in bending the rod. In any event, it often happened that the steel weeder rod was bent to an extent which would make it unusable until removed, straightened and replaced. This was a time-consuming and difficult procedure.

To overcome this problem, it was proposed to provide a weeder rod which was articulate, i.e., divided into segments which were united by movable joints between segments. With this structure, when an underground object was encountered by a chisel point and the shank moved up out of alignment, one of the flexible couplings which formed the movable joints gave way until the obstruction was passed. This avoided bending of the rod. However, the articulate rods had a number of disadvantages of their own; they were expensive, and the flexible couplings tended to wear and to require an inordinate amount of maintenance. Moreover, the flexible couplings made wide furrows, accumulated soil and created drag. And, like the solid rods, the articulate rods had to be driven in rotational movement to prevent soil accumulation. Thus the articulate rods suffered from all the unique disadvantages of their own type, as well as those associated with power-driven solid rods.

Still another disadvantage of prior art rod weeders resided in the fact that there was little or no provision in the rod mounting brackets for vertical adjustment. This deficiency severely limited the amount of control over the effective working depth of the chisel plow or other earth-working apparatus to which the rod weeder was attached. Where vertical adjustment was available, it was done only with difficulty, and was a time-consuming operation.

Accordingly, main objects of the invention are the provision of improved agricultural implements comprising rod weeders which remain free of soil accumulation, which eliminate requirements for power drive systems, which have a maximum degree of mechanical simplicity and reliability, which are inexpensive and require little or no maintenance, which are compact, easy to ship, handle and to attach to various types of agricultural equipment, which can be used in working rocky soil, and which permit easy and quick adjustment of the working depth of associated earthworking equipment.

Other objects of the invention will appear from the following detailed description which, when considered in connection with the accompanying drawings, discloses a preferred embodiment of the invention for purposes of illustration only and not for definition of the limits of the invention.

DESCRIPTION OF THE PREFERRED EMBODIMENT

Figure 1:
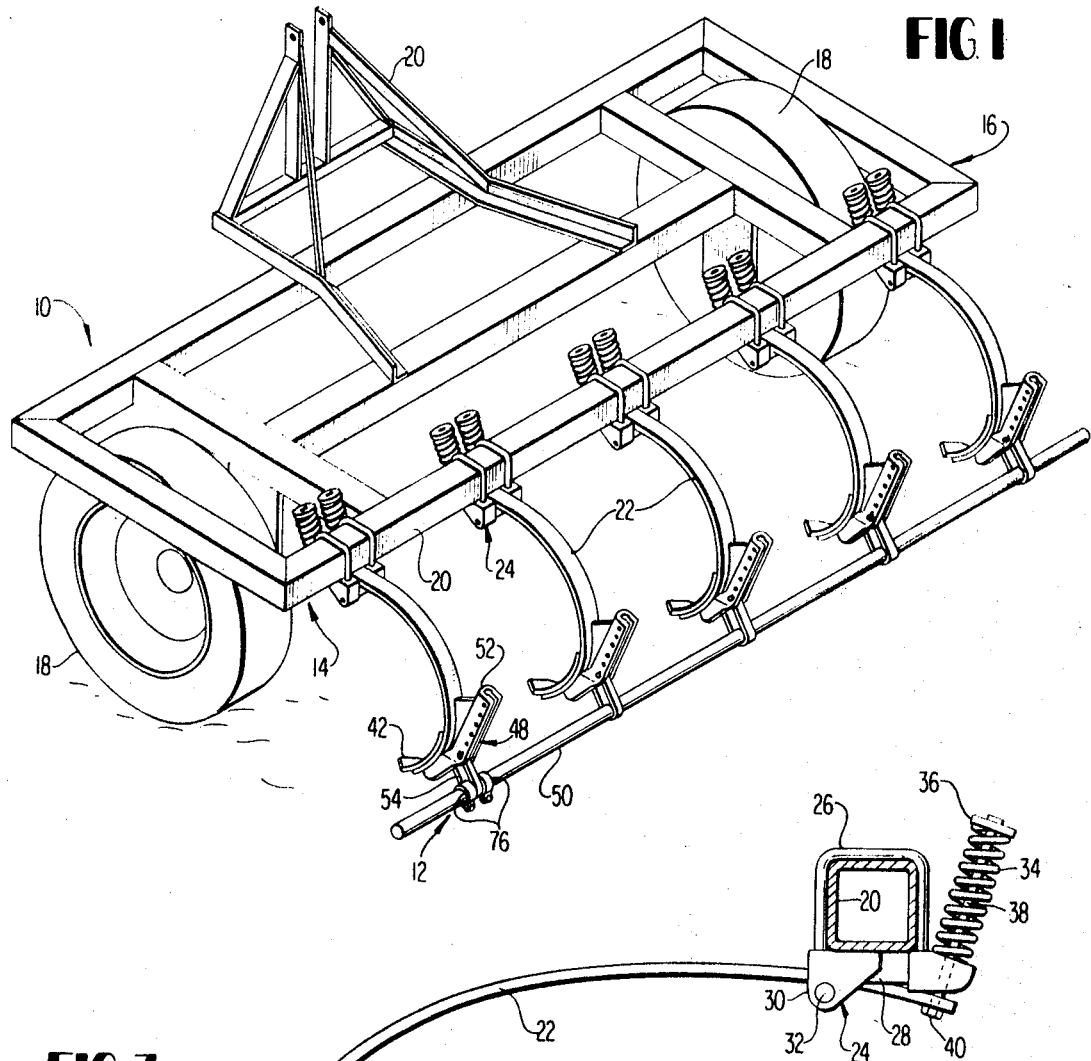
FIG. 1 is an isometric view illustrating an agricultural implement embodying principles of the invention.
Figure 3:
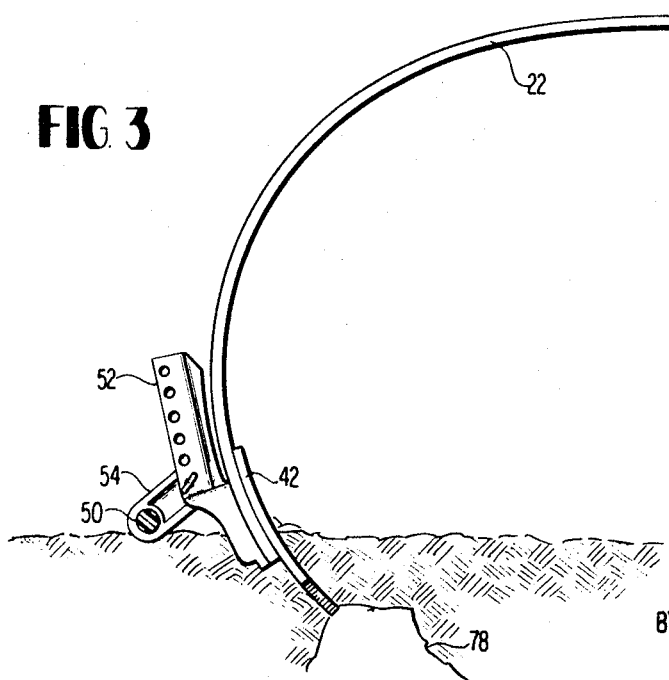
FIG. 3 is a view on cross-section line 3—3 of FIG. 2.

In FIG. 1, an agricultural implement 10 embodying principles of the invention takes the form of a rod weeder 12 attached to a chisel plow 14. The chisel plow includes the usual frame 16 which is mounted for movement across the ground by a pair of wheels 18. A draft bar assembly 20 is secured to frame 16 for attaching the implement to a tractor hitch. Frame 16 includes a transversely extending box beam 20 (see also FIG. 3) at the rear of the implement. A plurality of spaced-apart plow shanks 22 are pivotally mounted in a row on beam 20 by mounting brackets 24. Each pivotal mounting bracket 24 is clamped to beam 20 by a pair of U-bolts 26.

Pivotal mounting brackets 24 are of a conventional type; the details of the brackets are of no interest here and would unduly burden the instant application. For purposes of understanding the instant invention, it is sufficient to know that each bracket includes a body portion 28 from which a pair of lugs 30 projects downwardly. A pin 32 extends between the lugs, and plow shank 22 passes over the pin. The pin defines a pivot axis about which shank 22 swings to yield when the plow encounters an obstruction. The shank swings clockwise as viewed in FIG. 3, and upon such swinging action of the shank, each of a pair of coil springs 34 is compressed between the top surface of body portion 28 and a disc 36 at the top end of a bolt 38. The bolt passes through aligned apertures in body portion 28 and in shank 22 and has a head portion 40 underlying the shank. Springs 34 return the shank counterclockwise to its original position, after the plow has moved beyond the obstacle.

Figure 4:
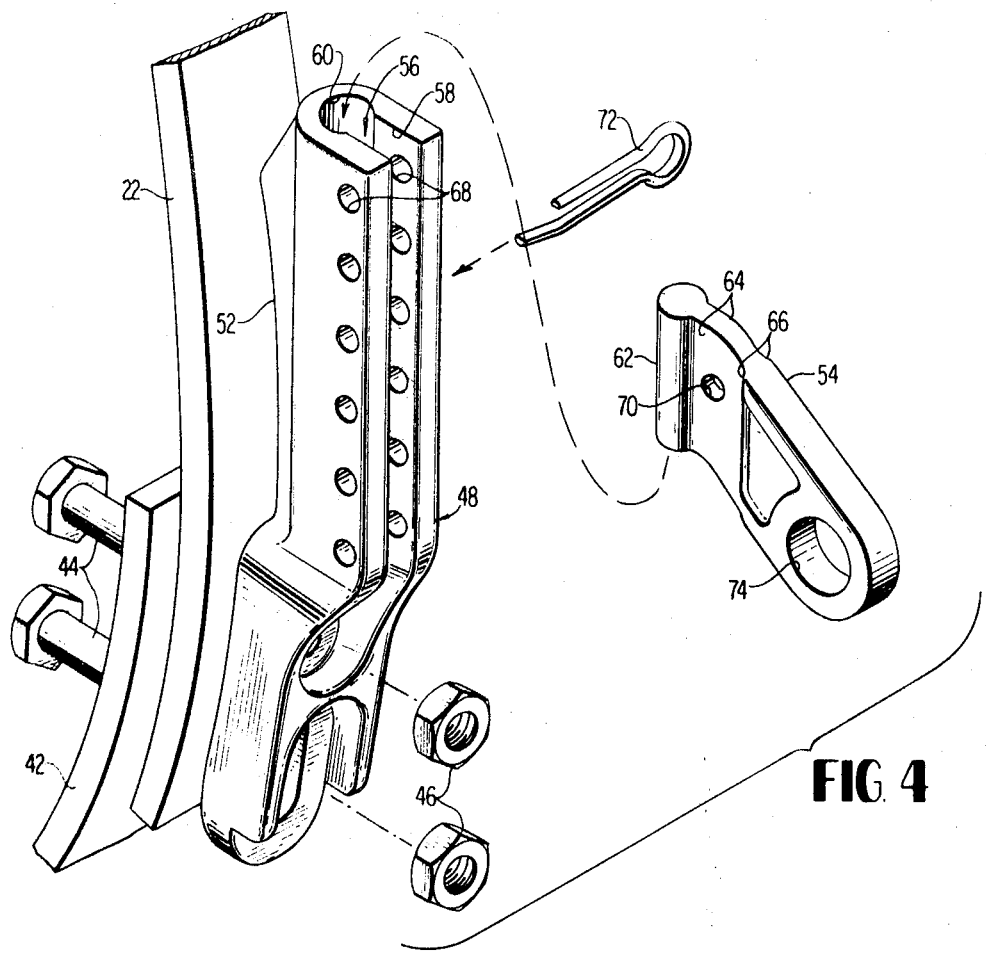
FIG. 4 is an exploded isometric view showing rod holder details of the structure of FIG. 1.

A chisel point 42 is secured to each shank 22 by a pair of plow bolts 44 (FIG. 4) and nuts 46. Plow bolts 44 pass through aligned apertures in chisel point 42 and shank 22. A weeder rod holder assembly 48 is bolted to each shank 22 by plow bolts 44, the bolts passing through rod holder apertures which are aligned with the apertures in the shank and in chisel point 42.

A resiliently flexible weeder rod 50 (FIG. 1) is mounted on rod holders 48 for movement through the soil at a location just below the surface of the soil as the implement is drawn across a field and the chisel plow breaks the ground ahead of the rod weeder attachment. Weeder rod 50 is inarticulate, i.e., it has no movable joints; it is a solid structure from end to end. Preferably, the rod is made from one piece of material. The rod preferably has a round cross-sectional configuration, and e.g. can be one inch in diameter. The round cross-sectional shape is advantageous in minimizing soil accumulation and in facilitating undercutting of weed roots and soil compaction.

The resilient flexibilty of the weeder rod 50 is of a magnitude to maintain the weeder rod substantially free of soil accumulation as the weeder rod moves through the soil. Stated differently, weeder rod 50 has sufficient resilient flexibility to prevent soil from accumulating on the rod to an extent that it interferes with the earthworking operation. The way in which the resilient flexibility of the rod maintains the rod in a clean condition will presently be made clear.

Each weeder rod holder 48 comprises a bracket member 52 and a rod bearing member 54. Rod bearing member 54 and bracket 52 are preferably made of ductile iron. Bracket 52 is bolted to plow shank 22 by the plow bolts described above, and includes a generally upright slot 56 (FIG. 4) which is open at the top for insertion of rod bearing 54. Slot 56 includes a constricted outer portion 58 and an enlarged inner portion 60. The slot forms a track for movement of rod bearing 54 in a generally vertical direction. The rod bearing has a configuration which is complementary to the slot to cooperate with the slot for movement along the slot. Thus, rod bearing 54 includes an enlarged, generally cylindrical head portion 62 which conforms to enlarged portion 60 of slot 56. Rod bearing 54 also includes back-to-back channel portions 64 which conform to constricted outer portion 58 of the slot. Enlarged head portion 62 of rod bearing 54, being cylindrical, is elongated in a direction along the slot, and in cooperation with elongated shoulders 66 at the outer sides of channel portions 64, prevent rotation of rod bearing 54 about a horizontal axis while permitting the rod bearing to move upwardly and downwardly in the slot.

Rod holder 48 includes structure for selectively locking rod bearing 54 at any of a plurality of positions spaced along slot 56. The locking structure includes six pairs of opposed adjustment apertures 68 formed in the side walls of the constricted outer portion 58 of slot 56. The locking structure also includes an aperture 70 formed in rod bearing 54. Aperture 70 can be aligned with each of the six pairs of adjustment apertures 68 in bracket 52. A clinch pin 72, when passed through aligned apertures in the bracket and rod bearing, holds the rod bearing against movement along the slot. By moving rod bearing 54 along the slot, the height of the rod relative to the tips of chisel points 42 can be adjusted. This permits variation of the working depth of the chisel points while maintaining the rod operating depth at a constant value. By bringing adjustment hole 70 in rod bearing 54 into alignment with the different pairs of adjustment apertures 68 in bracket 58, and inserting the clinch pin through the aligned apertures, the weeder rod can be locked in position for the desired working depth.

Each rod bearing 54 has an unlined bearing aperture 74 which receives the weeder rod. The weeder rod is free to rotate about its longitudinal axis in bearing aperture 74; for example, with a 1 inch weeder rod, bearing aperture 74 can have a diameter of 1.06 inches. However, it will be perceived that power means for driving the weeder rod in rotation about its axis are conspicuous by virtue of their absence.

Weeder rod 50 is slidable along its longitudinal axis in all of the rod bearings 54 save one. With respect to that one (the leftmost as viewed in FIG. 1), a pair of set collars 76, one on each of the opposite sides of the rod bearing, holds the rod against axial movement relative to that bearing and thereby prevents the rod from shifting axially out of its mounting in any of the rod bearings 54.

Figure 2:
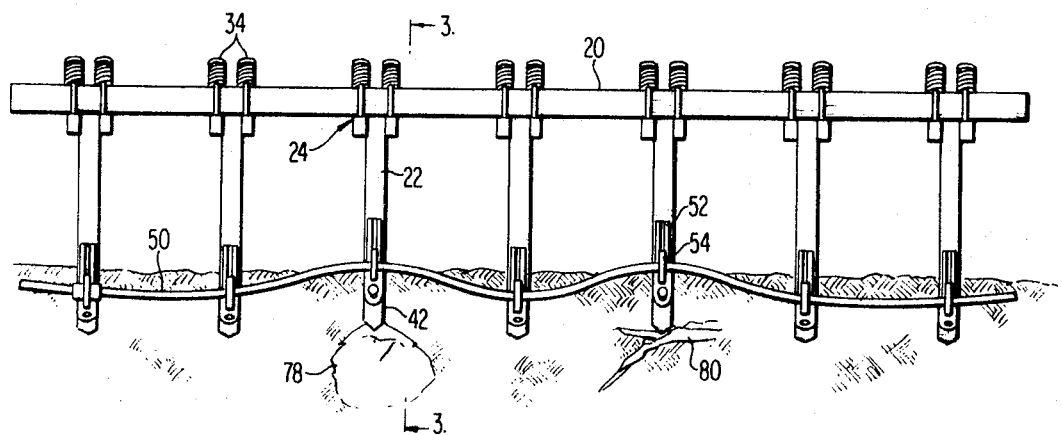
FIG. 2 is a rear view showing operation of the structure of FIG. 1.

In operation, as implement 10 is drawn across a field, frequently one or the other of the chisel points will encounter a relatively unyielding object such as a subsurface rock 78 or root 80 (FIG. 2). The associated plow shank 22 then yields, swinging about its axis on pivotal mounting bracket 24 rearwardly and upwardly out of lateral alignment with the other shanks. The flexibility of weeder rod 50 permits the shank 22 to move out of such alignment, the weeder rod bending with the shank movement. When the object has been passed by, the coil springs of the pivotal mounting bracket return shank 22 to its original position, and the resilience of the rod causes the rod to assume its original shape. The straightline distance between laterally contiguous rod bearings, over which the weeder rod extends when neither of the associated shanks is thrown out of alignment with the other, is greater than the curvilinear distance over which the rod extends or bends when one of the shanks is misaligned. However, because the weeder rod is held against axial movement at only one location along its length and is axially slidably received in the rod bearings, the extra length required for bending at any given location is provided by axial shifting of the portions of the rod between the bending location and the free end of the rod, i.e., that end which is not held against axial movement (the right end as viewed in FIG. 2).

As the implement traverses the ground, the weeder rod continuously flexes as the different chisel points encounter irregularities and obstacles in the soil. As the rod flexes and resiliently assumes its original configuration, it flicks off soil which would otherwise adhere to the rod and accumulate, were the rod not continuously undergoing flexure, resilient return to original shape, and re-flexure. Soil cannot accumulate on such an unstable, undulating base; the earth is repeatedly thrown off before it impairs the effectiveness of the earthworking operation.

As indicated above, weeder rod 50 must have resilient flexibility of a magnitude to maintain the rod substantially free of soil accumulation. A weeder rod which has the requisite resilient flexibility is capable of flexure to an angle of at least about 45° in 18 inches of weeder rod length without undergoing permanent deformation. Stated otherwise, the rod can be deformed to change its direction of extension by at least about 45° in only 18 inches of length, but still elastically return to its original undeformed configuration when the forces which caused the deformation are removed. Preferably, the weeder rod should be capable of resilient flexing to an angle of about 90° in 18 inches of rod length.

The preferred weeder rod material is nylon, which has a modulus of elasticity about 345,000 psi. However, other materials which produce a rod having resilient flexibility of the requisite order of magnitude could be employed. The modulus of elasticity of the material selected should be within a range of about 100,000 to about 600,000 psi. By way of contrast, the modulus of elasticity of the steels heretofore used for weeder rods is about 29,000,000 psi.

Weeder rods made of nylon have the added advantage of having self-lubricating surface properties, which further tend to prevent soil accumulation on the rods. This is particularly true when the rod is damp; the rod surface becomes even slicker and more resistant to soil accumulation than when dry, even though damp soil tends to stick together and tends to dampen and stick to the steel rods of the prior art to a greater degree than relatively dry soil.

Apparatus according to the invention are highly advantageous. Resilient flexure of the weeder rods prevents soil from accumulating on the rods and interfering with the earthworking operation. Yet, power drive systems for rotating the rod have been eliminated, so the advantage of avoidance of soil buildup is achieved together with all the advantages of elimination of power drive systems. The cost of the rod weeding equipment is drastically lower than power-driven systems of the prior art, since there is no motor, transmission, power take-off or expensive rod bearing arrangement required. There are no bearings, motor, transmission or like moving parts to lubricate, to wear out, or require replacement or other maintenance service. The structure is supremely simple from a mechanical standpoint; it has no moving parts and is practically maintenance-free. The structure is compact, and easy to ship and handle.

The weeder rods can be used in rocky soil, yet are inarticulate and thus easier and much more inexpensive to manufacture than the articulate rods of the prior art. Also, the inarticulate weeder rods in accordance with the invention do not require the maintenance required by the flexible couplings of the articulate prior art rods, and since the flexible couplings were sources of wide furrows, and soil accumulation, elimination of such couplings eliminates these disadvantages. And of course, inarticulate weeder rods according to the invention are not driven in rotational movement, as the prior art articulate rods must be.

Still further, the novel rod holder structure makes it easy to quickly attach the rod weeder to various types of farm equipment, when the weeder is made as an attachment. Also, the rod holders make it easy to vertically adjust the weeder rod to permit control over the effective working depth of a chisel plow or other device to which the rod weeder is attached. And the rod holders are no wider than the chisel points, and thus are not subject to soil accumulation as were wide complex rod bearings and drive connections of prior art powered rod systems.

The foregoing detailed description had reference to a preferred embodiment of the invention. Many, many other embodiments are within the contemplation of the invention. For example, the rod weeders can be attached to agricultural equipment other than chisel plows, e.g. field cultivators. Or the rod weeder can have its own mobile frame instead of being adapted for attachment to other farm equipment. Accordingly, for definition of the principles of the invention, reference will be made to the appended claims.

We claim:

1. Agricultural implement structure, comprising
a frame,
means mounting the frame for ground-traversing movement,
a plurality of weeder rod holders carried by the frame,
an inarticulate, resiliently flexible weeder rod mounted on the rod holders for movement through the soil as the frame traverses the ground,
the weeder rod being capable of resilient flexure to an angle of at least 45° in 18 inches of weeder rod length,
the resilient flexibility of the weeder rod being of a magnitude to maintain the weeder rod free of soil accumulation to an extent interfering with the earthworking operation as the weeder rod moves through the soil,
the weeder rod having a longitudinal axis,
the structure being characterized by absence of means for driving the weeder rod in rotation about the axis,
the weeder rod being axially movably mounted on at least a pluralism of the weeder rod holders, and
means holding the weeder rod at only one location along the weeder rod length against axial movement out of the pluralism of weeder rod holders.

2. The structure of claim 1,
the weeder rod being capable of resilient flexure to an angle of at least 90° in 18 inches of weeder rod length.

3. The structure of claim 1,
the weeder rod material having a modulus of elasticity within a range of about 100,000 to about 600,000 psi.

4. The structure of claim 1,
the weeder rod material having a modulus of elasticity of about 345,000 psi.

5. The structure of claim 1,
the weeder rod material being nylon.

6. The structure of claim 1,
the weeder rod having a round cross-sectional configuration.

7. The structure of claim 1,
each weeder rod holder comprising
a bracket member including means defining a generally upright track,
a bearing member including means cooperating with the track for movement of the bearing member along the track, and
lock means for selectively locking the bearing member at a plurality of positions spaced along the track.

8. The structure of claim 7,
the lock means including
means defining alignable apertures in the bracket member and the bearing member,
the apertures including a plurality of adjustment apertures spaced along the track, and
means for passing through aligned apertures in the bracket member and bearing member to hold the bearing member against movement along the track.

9. The structure of claim 7,
the track including means defining a slot in the bracket member,
the slot including an enlarged inner portion,
the bearing member having a configuration complementary to the slot for movement along the slot and including an enlarged portion conforming to the enlarged portion of the slot.

10. Agricultural implement structure, comprising
a plurality of weeder rod holders, and
a weeder rod,
each weeder rod holder including
a bracket member including means defining a generally upright track,
a bearing member including means cooperating with the track for movement of the bearing member along the track, and
lock means for selectively locking the bearing member at a plurality of positions spaced along the track,
the track including means defining a slot in the bracket member,
the slot including an enlarged inner portion,
the bearing member having a configuration complementary to the slot for movement along the slot and including an enlarged portion conforming to the enlarged portion of the slot.

11. The structure of claim 10,
the lock means including
means defining alignable apertures in the bracket member and the bearing member,
the apertures including a plurality of adjustment apertures spaced along the track, and
means for passing through aligned apertures in the bracket member and bearing member to hold the bearing member against movement along the track.

12. Agricultural implement structure, comprising
a frame,
means mounting the frame for ground-traversing movement,
a plurality of weeder rod holders carried by the frame, and
an inarticulate, resiliently flexible weeder rod mounted on the rod holders for movement through the soil as the frame traverses the ground,
the weeder rod being capable of resilient flexure to an angle of at least 45° in 18 inches of weeder rod length,
the resilient flexibility of the weeder rod being of a magnitude to maintain the weeder rod free of soil accumulation to an extent interfering with the earthworking operation as the weeder rod moves through the soil,
the weeder rod having a longitudinal axis,
the structure being characterized by absence of means for driving the weeder rod in rotation about the axis.

13. The structure of claim 12,
the weeder rod material having a modulus of elasticity of about 345,000 psi.

14. The structure of claim 13,
the weeder rod material being nylon.

15. The structure of claim 14,
the weeder rod having a round cross-sectional configuration.

16. The structure of claim 12,
the weeder rod being axially movably mounted on at least a pluralism of weeder rod holders, and including,
means holding the weeder rod at only one location along the weeder rod length against axial movement out of the pluralism of weeder rod holders.

17. The structure of claim 12,
each weeder rod holder comprising
a bracket member including means defining a generally upright track,
a bearing member including means cooperating with the track for movement of the bearing member along the track, and
lock means for selectively locking the bearing member at a plurality of positions spaced along the track.

18. The structure of claim 17,
the lock means including
means defining alignable apertures in the bracket member and the bearing member,
the apertures including a plurality of adjustment apertures spaced along the track, and
means for passing through aligned apertures in the bracket member and bearing member to hold the bearing member against movement along the track.

19. The structure of claim 18,
the track including means defining a slot in the bracket member,
the slot including an enlarged inner portion,
the bearing member having a configuration complementary to the slot for movement along the slot and including an enlarged portion conforming to the enlarged portion of the slot.

20. The structure of claim 19, the adjustment apertures being formed in the bracket member.

21. Agricultural implement structure, comprising
an inarticulate, resiliently flexible weeder rod for movement through the soil,
a plurality of holders for the weeder rod,
the weeder rod being capable of resilient flexure to an angle of at least 45° in 18 inches of weeder rod length,
the resilient flexibility of the weeder rod being of a magnitude to maintain the weeder rod free of soil accumulation to an extent interfering with the earthworking operation as the weeder rod moves through the soil,
the weeder rod having a longitudinal axis,
the structure being characterized by absence of means for driving the weeder rod in rotation about the axis,
the weeder rod being axially movably mounted on at least a pluralism of the weeder rod holders, and
means for holding the weeder rod at only one location along the weeder rod length against axial movement out of the pluralism of weeder rod holders.

* * * * *